United States Patent
Cheong et al.

(10) Patent No.: US 8,014,068 B2
(45) Date of Patent: Sep. 6, 2011

(54) WIRE GRID POLARIZER AND METHOD OF MANUFACTURING THE SAME

(75) Inventors: Byoung-ho Cheong, Yongin-si (KR); Jae-young Choi, Yongin-si (KR); June-mo Koo, Yongin-si (KR); Moon-gyu Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1049 days.

(21) Appl. No.: 11/760,812

(22) Filed: Jun. 11, 2007

(65) Prior Publication Data

US 2008/0117510 A1    May 22, 2008

(30) Foreign Application Priority Data

Nov. 21, 2006 (KR) .................. 10-2006-0115424

(51) Int. Cl.
*G02B 5/30* (2006.01)

(52) U.S. Cl. .............. 359/485.05; 359/487.03; 359/900

(58) Field of Classification Search .................. 359/486, 359/900, 485.05, 487.03
See application file for complete search history.

(56) References Cited

U.S. PATENT DOCUMENTS

| | | | | |
|---|---|---|---|---|
| 2,224,214 | A | * | 12/1940 | Brown .......................... 359/486 |
| 3,161,879 | A | * | 12/1964 | Hannan et al. .................... 342/5 |
| 3,536,373 | A | * | 10/1970 | Parrish, Jr et al. ............ 359/486 |
| 6,665,119 | B1 | * | 12/2003 | Kurtz et al. ................... 359/486 |
| 6,785,050 | B2 | * | 8/2004 | Lines et al. ................... 359/486 |
| 7,414,784 | B2 | * | 8/2008 | Mi et al. ........................ 359/486 |
| 2002/0046872 | A1 | * | 4/2002 | Smalley et al. ............. 174/137 A |
| 2004/0047038 | A1 | * | 3/2004 | Jiang et al. .................... 359/486 |
| 2005/0150767 | A1 | * | 7/2005 | Su et al. ........................ 204/483 |
| 2008/0252825 | A1 | * | 10/2008 | Kim et al. ....................... 349/96 |
| 2009/0052029 | A1 | * | 2/2009 | Dai et al. ...................... 359/486 |
| 2009/0074992 | A1 | * | 3/2009 | Lee et al. ..................... 428/1.31 |

* cited by examiner

*Primary Examiner* — Ricky D Shafer
(74) *Attorney, Agent, or Firm* — Sughrue Mion, PLLC

(57) ABSTRACT

A wire grid polarizer and a method of manufacturing the wire grid polarizer are provided. The wire grid polarizer includes: a substrate; and a plurality of core-shell nano wires arranged on the substrate and including wire cores and polymer shells enclosing the wire cores to a predetermined thickness.

12 Claims, 6 Drawing Sheets

WIRE GRID POLARIZER AND METHOD OF MANUFACTURING THE SAME

CROSS-REFERENCE TO RELATED PATENT APPLICATIONS

This application claims priority from Korean Patent Application No. 10-2006-0115424, filed on Nov. 21, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to a wire grid polarizer and a method of manufacturing the same and, more particularly, to a method of easily manufacturing a wire grid polarizer having a large-sized area without using a photolithography process.

2. Description of the Related Art

Polarization characteristics of light are used in many applications to conveniently control light emitted from light sources. For example, in a case of a display device using a liquid crystal display (LCD), liquid crystal molecules operate as a shutter to change a polarized orientation of linear light so as to transmit or intercept light. However, in general, light emitted from a light source is non-polarized light. Thus, polarizers are provided on both surfaces of an LCD. Also, an optical communication device shows a great difference in the efficiency of coupling to an external passive optical device depending on polarization characteristics.

FIG. 1 is a schematic perspective view of a related art wire grid polarizer. Referring to FIG. 1, the conventional wire grid polarizer includes a transparent substrate 1 and a plurality of nano wires 3 which are arranged at predetermined periods on the transparent substrate 1.

The wire grid polarizer having the above-described structure intercepts polarized light parallel to a longitudinal direction A of the nano wires 3 and transmits light polarized toward a direction B perpendicular to the longitudinal direction A.

Here, a width of the nano wires 3 is sufficiently shorter than a wavelength $\lambda$ of light incident on the related art wire grid polarizer. Also, a pitch between the adjacent nano wires 3 is smaller than $\lambda/2$.

If such a wire grid polarizer is manufactured using a photolithography process, the photolithography process must be controllable in the range less than approximately 100 nm. Thus, it is difficult to manufacture the wire grid polarizer to have a large-sized area.

A wire grid polarizer can also be manufactured using a method of manufacturing, stamping, and reproducing a master mold using an electron-beam (E-beam) and laser interference and then depositing a metal without using a photolithography process. However, a large amount of time is required to manufacture the master mold. Thus, there is a need for a method to properly manufacture a large-sized wire grid polarizer.

SUMMARY OF THE INVENTION

Exemplary embodiments consistent with the present invention provide a wire grid polarizer having a structure in which nano wires are arranged directly on a substrate without using a photolithography process or a master mold and a method of manufacturing the wire grid polarizer.

According to an aspect of the present invention, there is provided a wire grid polarizer including: a substrate; and a plurality of core-shell nano wires arranged on the substrate and including wire cores and polymer shells enclosing the wire cores to a predetermined thickness.

According to another aspect of the present invention, there is provided a method of manufacturing a wire grid polarizer, including: manufacturing a plurality of core-shell nano wires including wire cores and polymer shells enclosing the wire cores to a predetermined thickness; and arranging the core-shell nano wires on a substrate so that the core-shell nano wires are parallel with the substrate.

BRIEF DESCRIPTION OF THE DRAWINGS

The above and other features and advantages of the present invention will become more apparent by describing in detail exemplary embodiments thereof with reference to the accompanying drawings, in which.

DETAILED DESCRIPTION OF EXEMPLARY EMBODIMENTS OF THE INVENTION

Figure 1:
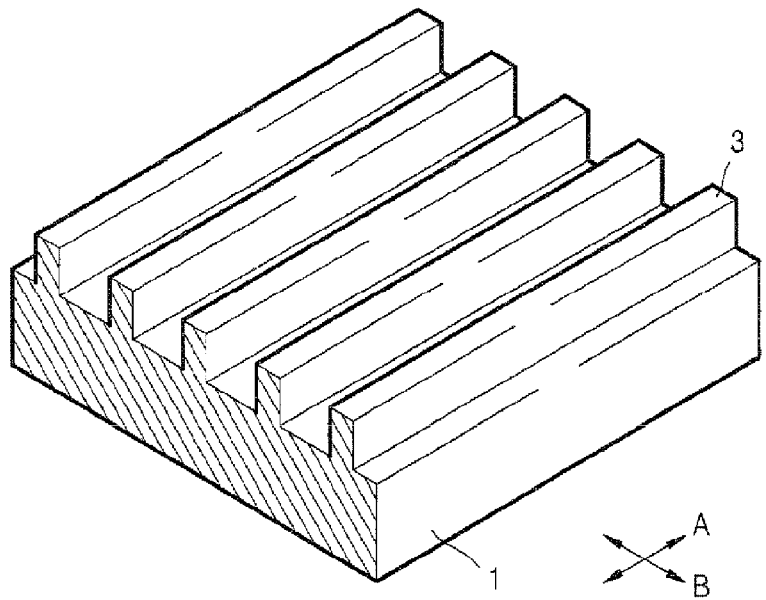
FIG. 1 is a schematic perspective view of a related art wire grid polarizer.

The present invention will now be described more fully with reference to the accompanying drawings, in which exemplary embodiments of the invention are shown. The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements, and thus their description will be omitted.

Figure 2:
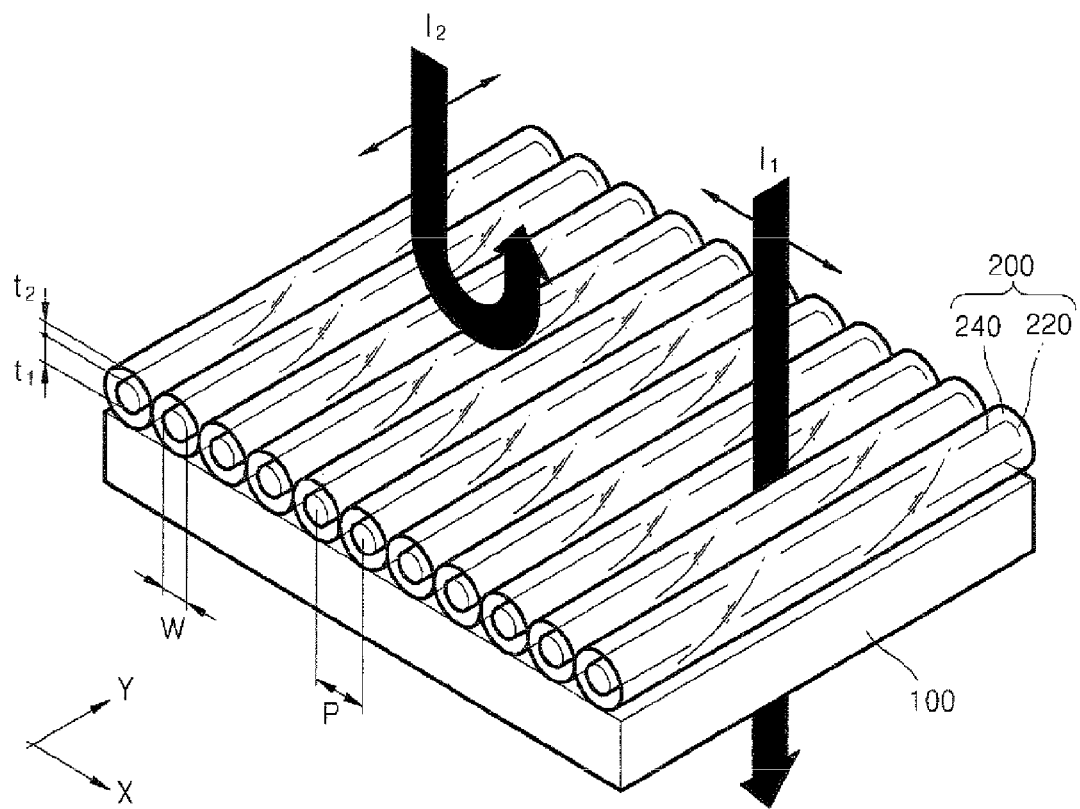
FIG. 2 is a perspective view of a wire grid polarizer according to an exemplary embodiment of the present invention.
Figure 3A:
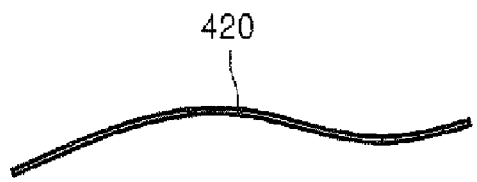
FIGS. 3A through 3E are cross-sectional views and perspective views illustrating a method of manufacturing a wire grid polarizer according to an exemplary embodiment of the present invention.
Figure 3B:
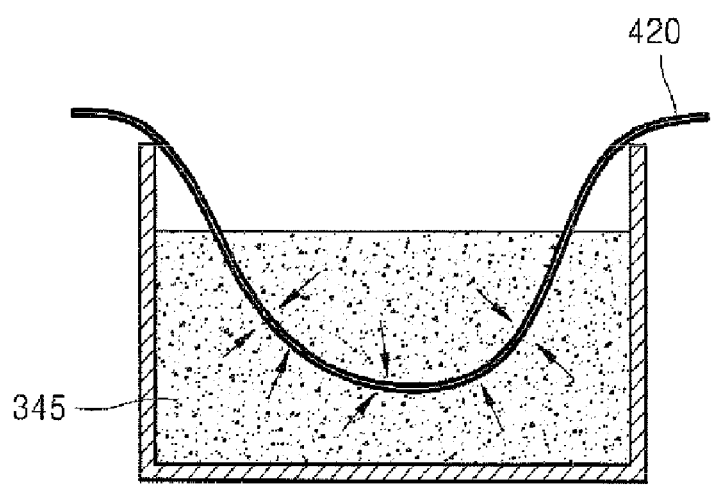
Figure 3C:
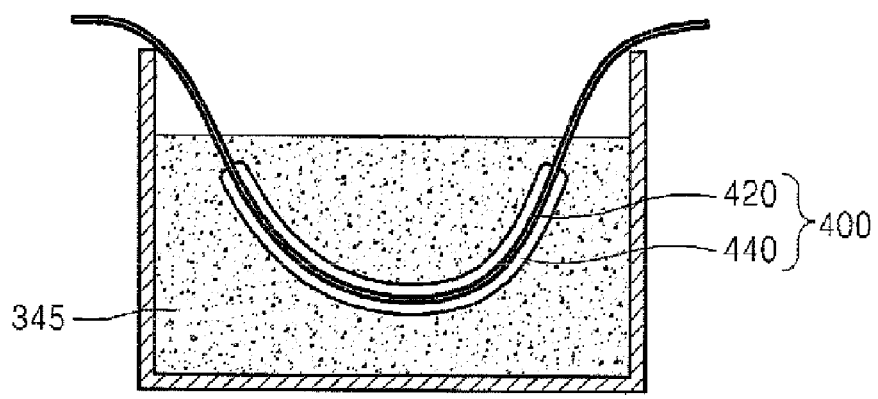
Figure 3D:
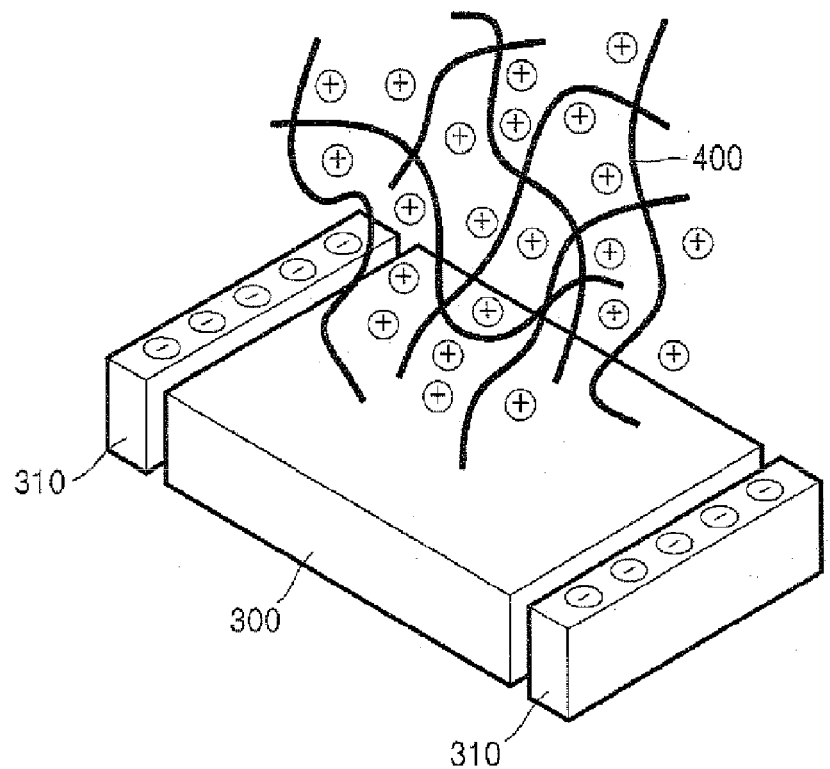
Figure 3E:
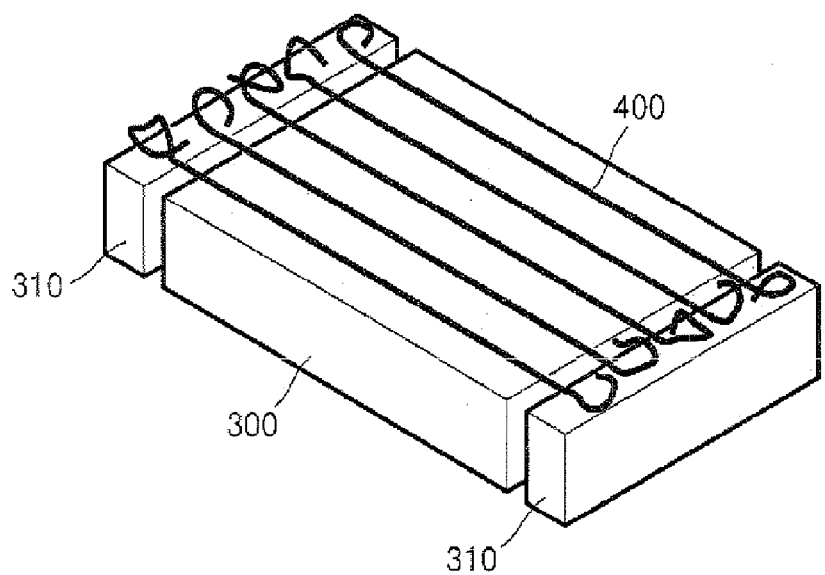

FIG. 2 is a perspective view of a wire grid polarizer according to an exemplary embodiment of the present invention. Referring to FIG. 2, the wire grid polarizer according to the present exemplary embodiment includes a substrate 100, and a plurality of core-shell nano wires 200 which are arranged on the substrate 100.

The core-shell nano wires 200 include wire cores 220 and polymer shells 240 which enclose the wire cores 220 to a predetermined thickness.

The plurality of core-shell nano wires 200 are disposed along a first direction (an X direction) with pitch p and their lengths are parallel to a second direction (a Y direction).

The wire cores 220 have circular cross-sections having a thickness $t_1$ and a width w, and the polymer shells 240 enclose the wire cores 220 to a predetermined thickness $t_2$. However, the cross-sections of the wire cores 220 are not limited to the above but may have various shapes such as square shapes or elliptical shapes having different values for the thickness $t_1$ and the width w.

The wire grid polarizer transmits a portion of incident light polarized in the first direction and reflects a portion of the incident light polarized in the second direction due to a material and an arrangement of the wire cores 220. Thus, the wire cores 220 may be formed of a metal material having a high reflectance. For example, the wire cores 220 may be formed of, for example, aluminum (Al), gold (Au), or silver (Ag).

The polymer shells 240 coat the wire cores 220 to enclose the wire cores 220. The polymer shells 240 may be formed of a transparent material, e.g., polymethyl methacrylate (PMMA) or polyester (PET).

A size of the wire grid polarizer, e.g., the pitches p of the core-shell nano-wires 200, the thickness $t_1$ and the width w of the wire cores 220, and the thickness $t_2$ of the polymer shells 240, may be appropriately determined in consideration of the material of the wire cores 220 and a wavelength $\lambda$ of the incident light. For example, since the wire cores 220 operate as a reflection metal for light polarized in a longitudinal direction of the wire cores 220, the thickness $t_1$ of the wire cores 220 is sufficiently thick to reflect the incident light. Also, the width w of the wire cores 220 must be sufficiently shorter than the wavelength $\lambda$ of the light incident on the wire grid polarizer. In addition, the pitches p between the adjacent core-shell nano wires 200 may be smaller than $\lambda/2$ so that a diffraction effect does not show due to a regular arrangement of the core-shell nano wires 200. Since the minimum pitches p between the core-shell nano wires 200 may be limited according to the thickness $t_2$ of the polymer shell 240, the thickness $t_2$ of the polymer shells 240 is appropriately determined in consideration of the pitches p between the core-shell nano wires 200.

A principle of the wire grid polarizer which reflects the portion of the incident light polarized in the longitudinal direction (the X direction) of the core-shell nano wires 200 and transmits the portion of the incident light polarized in the Y direction is as follows. The wire grid polarizer controls polarized light according to a reaction characteristic of polarized light formed by free electrons inside the wire cores 220, i.e., inside the metal from which the wire cores 220 are formed. If second polarized light $I_2$, i.e., light polarized in a direction parallel to the longitudinal direction of the wire cores 220, is incident on the wire cores 220, the free electrons of the wire cores 220 vibrate along the longitudinal direction. A large part of the second polarized light $I_2$ is reflected due to an attenuation of electromagnetic waves caused by the vibration of the free electrons. In other words, the wire cores 220 show high reflection metal characteristics with respect to the second polarized light $I_2$. If first polarized light $I_1$, i.e., light polarized in a direction parallel with a width direction of the wire cores 220, is incident on the wire cores 220, the vibration of the free electrons of the wire cores 220 along the width direction is spatially limited. Thus, the attenuation of the electromagnetic waves does not occur and a large part of the first polarized light $I_1$ is transmitted. In other words, the wire cores 220 show dielectric characteristics with some loss with respect to the first polarized light $I_1$.

A method of manufacturing a wire grid polarizer having a structure as described above will now be described with reference to FIGS. 3A through 3E, 4, and FIGS. 5A through 5D.

Figure 4:
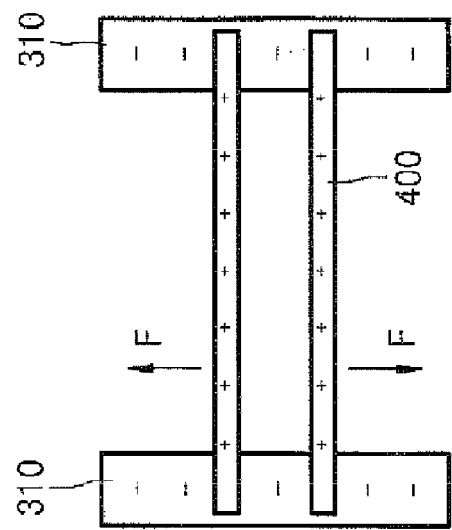
FIG. 4 is a view illustrating a process of arranging a plurality of core-shell nano wires on a substrate in the method illustrated in FIGS. 3A through 3E.
Figure 4:
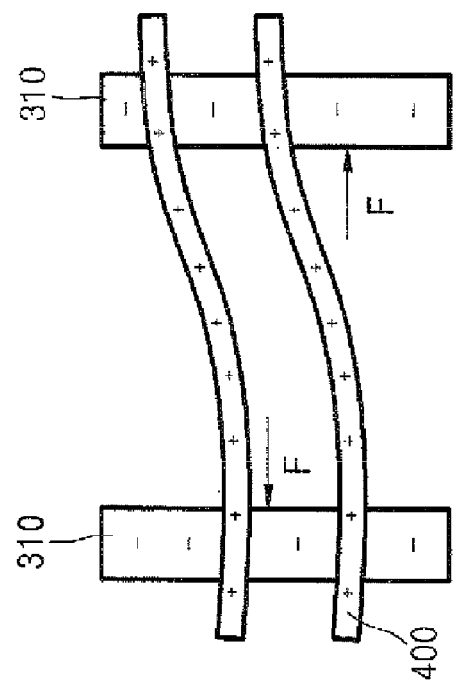
Figure 5A:
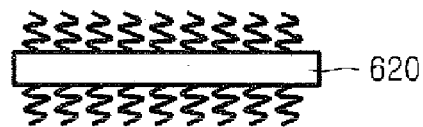
FIGS. 5A through 5D are cross-sectional views and a perspective view illustrating a method of manufacturing a wire grid polarizer according to another exemplary embodiment of the present invention.
Figure 5B:
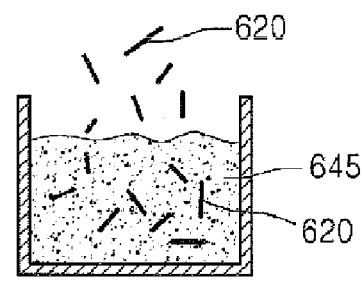
Figure 5C:
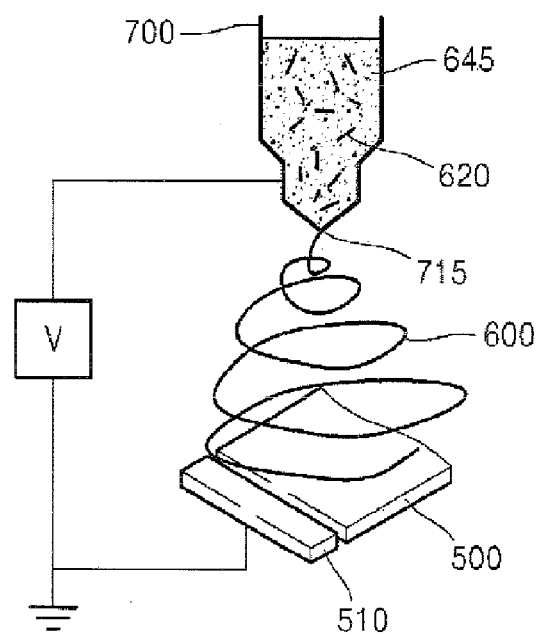
Figure 5D:
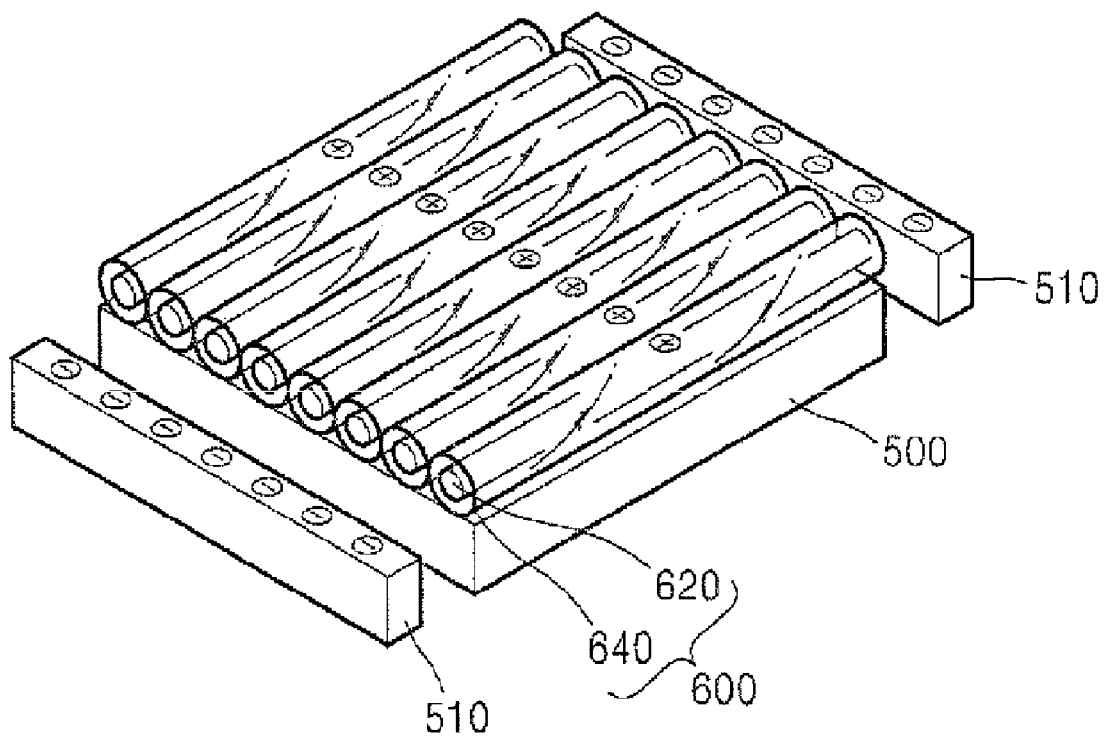

FIGS. 3A through 3E are cross-sectional views and perspective views illustrating a method of manufacturing a wire grid polarizer according to an exemplary embodiment of the present invention, and FIG. 4 is a view illustrating a process of arranging a plurality of core-shell nano wires on a substrate in the method illustrated in FIGS. 3A through 3E.

A wire core 420 formed of a metal to a predetermined length is provided. The wire core 420 is dipped into a polymer solution 345. For example, the polymer solution 345 may be formed by melting PMMA in an organic solvent such as toluene. A surface of the wire core 420 dipped into the polymer solution 345 is coated with polymer 440, e.g., PMMA, to complete a core-shell nano wire 400. A thickness of the polymer solution 345, a time required for dipping the wire core 420 into the polymer solution 345, or a number of times the polymer 440 is coated may be appropriately adjusted to determine a thickness of the polymer 440 coated on the surface of the wire core 420. The core-shell nano wire 400 is electrified and then scattered on a substrate 300. Plates 310 electrified with opposite charges to the core-shell nano wire 400 are provided beside both ends of the substrate 300. For example, if the core-shell nano wire 400 is electrified with positive charges, the plates 310 electrified with negative charges are disposed beside the opposite ends of the substrate 300. Referring to FIG. 4, an electrostatic attractive force acts between surface charges of the core-shell nano wire 400 and the plates 310. Thus, both ends of the core-shell nano wire 400 are respectively pulled toward the plates 310. As a result, the core-shell nano wire 400 is tightly arranged on the substrate 300. Also, a repulsive force acts between the core-shell nano wires 400 electrified with the same charges. Thus, a plurality of core-shell nano wires 400 are arranged at regular intervals. A distance between the adjacent core-shell nano wires 400 may be adjusted via the thickness of the polymer 440 and a surface charge amount between the core-shell nano wires 400 and the plates 310. For this purpose, in the present exemplary embodiment, an amount of charges electrifying the core-shell nano wires 400 and the plates 310 may be adjusted by a controller (not shown) so as to properly maintain the distance between the core-shell nano wires 400.

In the above-described method, metal particles can be coated on a surface of a carbon nano tube (CNT) to manufacture wire cores. Also, polymer fibers formed of an optical anisotropic material may be used as core-shell nano wires instead of coating polymer shells on surfaces of the wire cores.

In the above-described method, a plurality of core-shell nano wires may be arranged on a substrate using a Langmuir-Blodgett (LB) method. When non-volatile and non-aqueous materials exist on a surface of a solution, the non-volatile and non-aqueous materials are dispersed and arranged at fixed intervals according to the diffusion theory. Also, the non-volatile and non-aqueous materials may be transferred onto the substrate in a process of dipping the substrate into the solution and taking the substrate out of the solution. This is briefly the LB method. For example, if core-shell nano wires are hydrophobic and dipped into a solution, the core-shell nano wires may arranged on a surface of the solution. Also, the core-shell nano wires may be arranged on a substrate through a process of dipping the substrate into the solution and taking the substrate out of the solution. The LB method is well known to those skilled in the art, and thus its detailed description will be omitted.

In addition, core-shell nano wires may be manufactured using other methods besides a method of dipping the wire cores 420 into a polymer solution. For example, core-shell wires may be manufactured using a method of passing wire cores through a solution into which polymer is heated and melted at a temperature greater than or equal to a melting point to coat polymer shells to a predetermined thickness on surfaces of the wire cores.

Moreover, core-shell nano wires may be manufactured using an electrospinning method. FIGS. 5A through 5D are cross-sectional views and a perspective view illustrating a method of manufacturing a wire grid polarizer according to another exemplary embodiment of the present invention. In this case, core-shell nano wires are manufactured using an electrospinning method. The electrospinning method is used for gushing a solution of a material to be fiberized from ends of nozzles to emit the solution used by applying a high voltage to the solution to electrify the solution. In the present exemplary embodiment, a wire core 620 having a bar shape is dipped into a polymer solution 645 to manufacture a core-shell nano wire 600 including a wire core 620 and a polymer shell 640 enclosing the wire core 620 to a predetermined thickness. A surface of the wire core 620 is processed to be hydrophilic or hydrophobic according to a property of the polymer solution 645. A solution including the wire core 620 and the polymer solution 645 is poured into a syringe 700, and then a high voltage between 10000V and 30000V is applied between the syringe 700 and plates 510. When a repulsive force between molecules of the solution exceeds a surface tension of the solution due to electrification, the solution is ejected through a nozzle 715. That is, electrified core-shell nonowire 600 is ejected. The core-shell nano wire 600 is electrified with opposite charges to those electrifying the plates 510 which are provided besides opposite ends of a substrate 500. Thus, the core-shell nano wire 600 is uniformly arranged on the substrate 500 to be parallel with each other as described with reference to FIG. 4.

As described above, consistent with the present invention, the wire grid polarizer can include core-shell nano wires. Also, the core-shell nano wires can be manufactured and then arranged on a substrate. Thus, a photolithography process of 100 nm or less does not need to be performed or a master mold does not need to be manufactured. In addition, the wire grid polarizer can be easily formed to have a large-sized area using a limited number of processes.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of manufacturing a wire grid polarizer, comprising:
    manufacturing a plurality of core-shell nano wires comprising wire cores and polymer shells enclosing the wire cores to a predetermined thickness; and
    arranging the core-shell nano wires on a substrate so that the core-shell nano wires are parallel to each other,
    wherein the arranging of the core-shell nano-wires comprises:
        supplying charges to surfaces of the core-shell nano wire to electrify the surfaces of the core-shell nano wires; and
        disposing plates besides opposite ends of the substrate, wherein the plates are electrified with charges opposite to charges electrifying the core-shell nano wires.

2. The method of claim 1, further comprising adjusting amounts of charges electrifying the core-shell nano wires and the wires to maintain an appropriate distance between the adjacent core-shell nano wires.

3. The method of claim 1, wherein the core-shell nano wires are arranged on the substrate using a Langmuir-Blodgett (LB) method.

4. The method of claim 1, wherein the core-shell nano wires are manufactured using an electrospinning method.

5. The method of claim 4, wherein plates electrified with opposite charges to charges electrifying the core-shell nano wires are disposed besides opposite ends of the substrate to arrange the core-shell nano wires on the substrate using an electrostatic force.

6. The method of claim 1, wherein to manufacture the core-shell nano wires, polymer is melted into an organic solvent to manufacture a polymer solution, and the wire cores pass the polymer solution to coat surfaces of the wire cores with the polymer.

7. The method of claim 1, wherein to manufacture the core-shell nano wires, polymer is melted into an organic solvent to manufacture a polymer solution, and the wire cores are passed through the polymer solution to coat surfaces of the wire cores with the polymer.

8. The method of claim 7, wherein the polymer is polymethyl methacrylate (PMMA), and the organic solvent is toluene.

9. The method of claim 1, wherein polymer is heated at a temperature greater than or equal to a melting point to melt the polymer into a solution, and then the wire cores are passed through the solution to coat the wire cores, so as to manufacture the core-shell nano wires.

10. The method of claim 1, wherein polymer is heated at a temperature greater than or equal to a melting point to melt the polymer into a solution, and then the wire cores are passed through the solution to coat the wire cores, so as to manufacture the core-shell nano wires.

11. The method according to claim 1, wherein the polymer shells are formed of one of polymethyl methacrylate (PMMA) and polyester (PET).

12. The method according to claim 1, wherein cross-sections of the wire cores are one of circular, elliptical, and square-shaped.

* * * * *